United States Patent [19]

Allen et al.

[11] Patent Number: 5,384,652
[45] Date of Patent: Jan. 24, 1995

[54] INFRARED COMMUNICATION REPEATER ARCHITECTURE

[75] Inventors: Richard C. Allen, Los Gatos; Gary M. Cisneros; Stanley L. Fickes, both of San Jose; Gary N. Hughes, Portola Valley; Walter S. Johnson, San Jose; James L. Konsevich, San Jose; John Piccone, San Jose; Bernard E. Stewart, Fremont, all of Calif.

[73] Assignee: Photonics Corporation, San Jose, Calif.

[21] Appl. No.: 970

[22] Filed: Jan. 6, 1993

Related U.S. Application Data

[63] Continuation of Ser. No. 659,501, Feb. 22, 1991, abandoned.

[51] Int. Cl.$^6$ .................. H04B 10/00; H04B 10/02
[52] U.S. Cl. ........................... 359/172; 359/154; 359/174; 359/176; 370/75.1; 370/35
[58] Field of Search ............ 359/136, 137, 154, 159, 359/172, 174, 176; 370/75, 13.1, 35; 455/9, 15, 16, 11.1

[56] References Cited

U.S. PATENT DOCUMENTS

| | | | |
|---|---|---|---|
| 3,676,846 | 7/1972 | Busch | 340/146.1 BA |
| 3,979,719 | 9/1976 | Tooley et al. | 340/146.1 BA |
| 4,377,862 | 3/1983 | Koford et al. | 371/32 |
| 4,402,090 | 8/1983 | Gfeller et al. | 455/601 |
| 4,497,068 | 1/1985 | Fischer | 455/603 |
| 4,540,605 | 9/1985 | Barone | 427/243 |
| 4,584,720 | 4/1986 | Garrett | 455/608 |
| 4,596,050 | 6/1986 | Rogers | 455/607 |
| 4,608,714 | 8/1986 | Juengel | 455/603 |
| 4,627,106 | 12/1986 | Drake | 455/617 |
| 4,723,314 | 2/1988 | Schneeberger | 455/619 |
| 4,742,577 | 5/1988 | Valdmanis | 455/618 |
| 4,763,291 | 8/1988 | Schwaber | 364/704 |
| 4,779,274 | 10/1988 | Takahashi et al. | 371/32 |
| 4,809,257 | 2/1989 | Gantenbein et al. | 370/4 |
| 4,864,647 | 9/1989 | Harrington | 455/603 |
| 4,897,883 | 1/1990 | Harrington | 455/603 |
| 4,933,936 | 6/1990 | Rasmussen et al. | 370/85.9 |
| 4,959,874 | 9/1990 | Saruta et al. | 455/601 |
| 4,975,926 | 12/1990 | Knapp | 375/1 |

FOREIGN PATENT DOCUMENTS

| | | |
|---|---|---|
| 58-103242 | 6/1983 | Japan . |
| 59-235 | 1/1984 | Japan . |
| 59-79650 | 5/1984 | Japan . |
| 60-180230 | 9/1985 | Japan . |
| 61-23427 | 1/1986 | Japan . |
| 8800894 | 3/1988 | WIPO . |

OTHER PUBLICATIONS

Gfeller, "Infranet: Infrared Microbroadcasting Network For In-House Data Communication", IBM Zurich Research Laboratory, P27-1-P27-4.

Gfeller, Müller, and Vettiger, "Infrared Communication for In-House Applications", 1978 IEEE, pp. 132-138.

Gfeller and Bapat, "Wireless In-House Data Communication via Diffuse Infrared Radiation", Proceedings of the IEEE, vol. 67, No. 11, pp. 1474-1486, Nov. 1979.

Gfeller and Mumprecht, "Minicomputer System Components Interconnected Via a Serial Infrared Link", IBM Technical Disclosure Bulletin, vol. 25, No. 8, pp. 4135-4137, Jan. 1983.

"Asynchronous Communication Link for Infrared Transmission", IBM Technical Disclosure Bulletin, vol. 28, No. 9, pp. 4083-4085, Feb. 1986.

"Touchpad Cable Function", IBM Technical Disclosure Bulletin, vol. 28, No. 9, pp. 4089-4090, Feb. 1986.

"Group Encoding For Infrared Communication", IBM Technical Disclosure Bulletin, vol. 28, No. 10, pp. 4440-4441, Mar. 1986.

Primary Examiner—Richard E. Chilcot, Jr.
Assistant Examiner—Rafael Bacares
Attorney, Agent, or Firm—Haverstock, Medlen & Carroll

[57] ABSTRACT

A diffuse infrared communication link provides for communication directly between nodes each having a transceiver. A repeater may be present to facilitate communication. Each node is automatically reconfigurable between operation with or without a repeater. When a repeater is present each node automatically ignores any transmission by another node.

5 Claims, 9 Drawing Sheets

INFRARED COMMUNICATION REPEATER ARCHITECTURE

This application is a continuation application of the application Ser. No. 07/659,501 filed on Feb. 22, 1991 now abandoned.

FIELD OF THE INVENTION

This invention relates to the field of information communication between machines. More particularly, this invention relates to information communication using infrared signals as the communication medium.

BACKGROUND OF THE INVENTION

In the field of data communication between and among various digital machines traditionally, such machines are linked with wire, coaxial cable, optical cable and the like. The communication link between machines has tied the machine to a particular location such as the user's desk. Even with an aimed infrared link such as disclosed in U.S. Pat. No. 4,977,618 a computer must be hardwired to the infrared transceiver and essentially immobile.

With the advent of portable and notebook computers and availability of application software, users want the power of a network without being chained to their desk. Such a user includes a corporate employee and student. In the corporate environment the user will produce their work product on their notebook computer. Additionally, fellow employees will attempt to communicate with the user via electronic mail over a local area network. Accordingly, the user desires to carry his notebook with him throughout the corporation for example, to meetings, to a laboratory, to seminars and the like. The user will want to access data or provide data to fellow workers at meetings, lectures and the like as well as take notes, compile data, prepare memos, annotate documents and be able to access the network while doing so.

A student will move from classroom to classroom, to the library, to laboratories and other similar locations with their notebook. Ideally, a student would receive an assignment via the network, prepare the assignment on their notebook computer and return the assignment via the network for grading. Tests could be similarly administered. The immobility of a node on a traditional network severely restricts the power of a portable by either preventing portability or when portable preventing access to a network.

Information has been transmitted via radio signals. A radio transceiver would allow a user mobile access to a local area network. However, radio is subject to rigorous control by the Federal Communications Commission making this approach prohibitively expensive. Further, the information transmitted over or stored on a radio local area network is vulnerable to intentional or inadvertent corruption or theft.

Another approach using diffuse infrared signals, allows a user mobility within a given chamber. A transponder is incorporated in a ceiling or wall of this technique. Multiple transponders are also contemplated for chambers too large to be efficiently covered by a single transponder. Those multiple transponders are connected together by signal cables. By requiring the transponders to be connected by wire the same difficulty and problems associated with forming cable connections are incurred as for an ordinary link such as a local area network. Such a system only allows node to node communication via the ceiling transponder. No direct node to node communication is possible. Thus, every room within a facility would be required to have a transponder for communication. No communication would be possible unless a transponder were present. Further, a protocol or architecture for data communication allowing true user mobility has never been achieved.

SUMMARY OF THE INVENTION

Communication via an infrared link provides a suitable medium for a network type link for portable nodes such as notebook computers. The link can operate with or without a repeater circuit. Each node is automatically reconfigurable to accommodate the link whether repeater is present or not.

Each node includes a diffuse infrared transceiver coupled to each node for transmitting and receiving encoded infrared signals, means for communicating directly between nodes where no repeater in present and means for preventing communication directly between nodes where a repeater is present. Communication between nodes where a repeater is present includes a sending node transmitting an encoded infrared signal to the repeater and the repeater retransmitting the encoded infrared signal to a receiving node.

The link can successfully operate with multiple repeaters. Only a repeater with a token may communicate with a node. A repeater can manufacture a token if no adjacent repeater has a token.

DETAILED DESCRIPTION OF THE PREFERRED EMBODIMENT

Information is communicated in a network over diffuse infrared signals. A network node can be a portable or notebook computer. A node may also be a conventional personal computer, printer, modem, file server and the like. However, other nodes are also envisioned. For example, a node may include a special purpose hand-held inventory control unit utilized by warehouse operator or a hand-held special purpose quality control module on a factory floor. For purposes of this disclosure, a node shall mean any digital machine capable of communicating on a digital communications network such as a local area network whether mobile or not. Thus, a node could be a notebook computer, a desk top personal computer, printer, fax machine, file server or the like.

Figure 1:
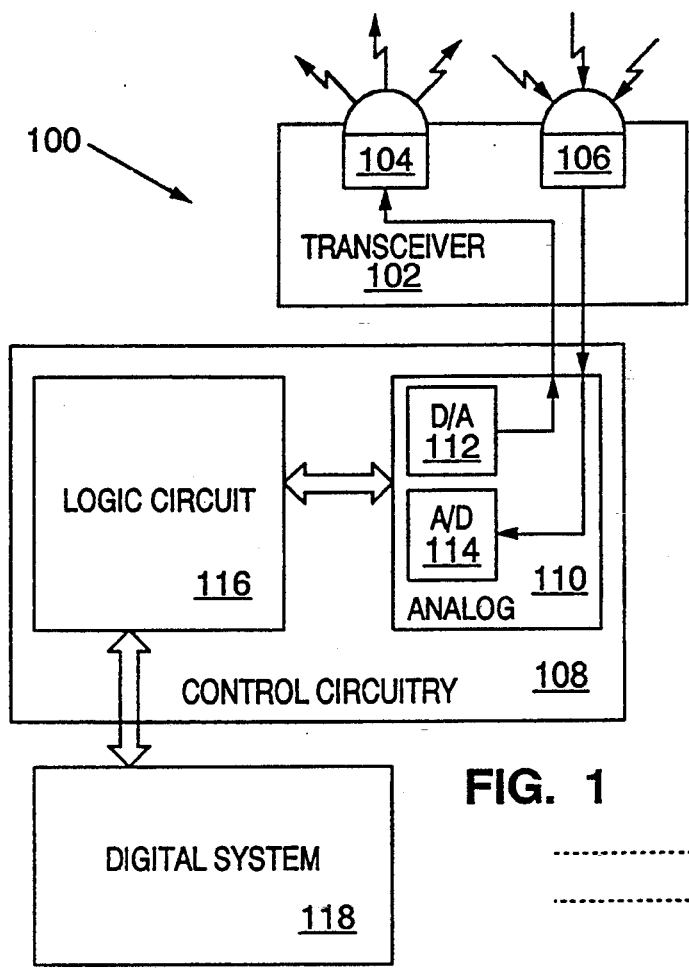
FIG. 1 shows a block diagram of a typical node according to the preferred embodiment.

FIG. 1 shows a block diagram of a typical node according to the preferred embodiment. Each node 100 in the communications network will include an infrared transceiver 102. Each transceiver 102 includes an infrared transmitter 104 such as an infrared light emitting diode, an infrared receiver 106 such as a photo diode or a phototransistor and the appropriate control circuitry 108. Multiple infrared light emitting diodes may be used to increase the transmission power of the infrared transmitter 104. The control circuitry 108 will include analog circuitry 110 to drive the infrared light emitting diodes including a D/A converter 112 and evaluate signals received by the photo diode including an A/D converter 114. The control circuitry 108 also includes logic circuits 116 which can communicate with the analog circuitry 110 and the digital system 118 of the node. The logic circuit 116 has sufficient capability to carry out the functions described below.

A node which operates according to the present invention will properly function in a room whether or not a ceiling repeater is present. In other words, a network can be established among several nodes which can share information in the same way that a hardwired local area network can share information without the intercession of a repeater circuit. A network can also be established in a room containing a repeater circuit or multiple repeater circuits. Each of these three separate operating cases will be described.

Figure 2:
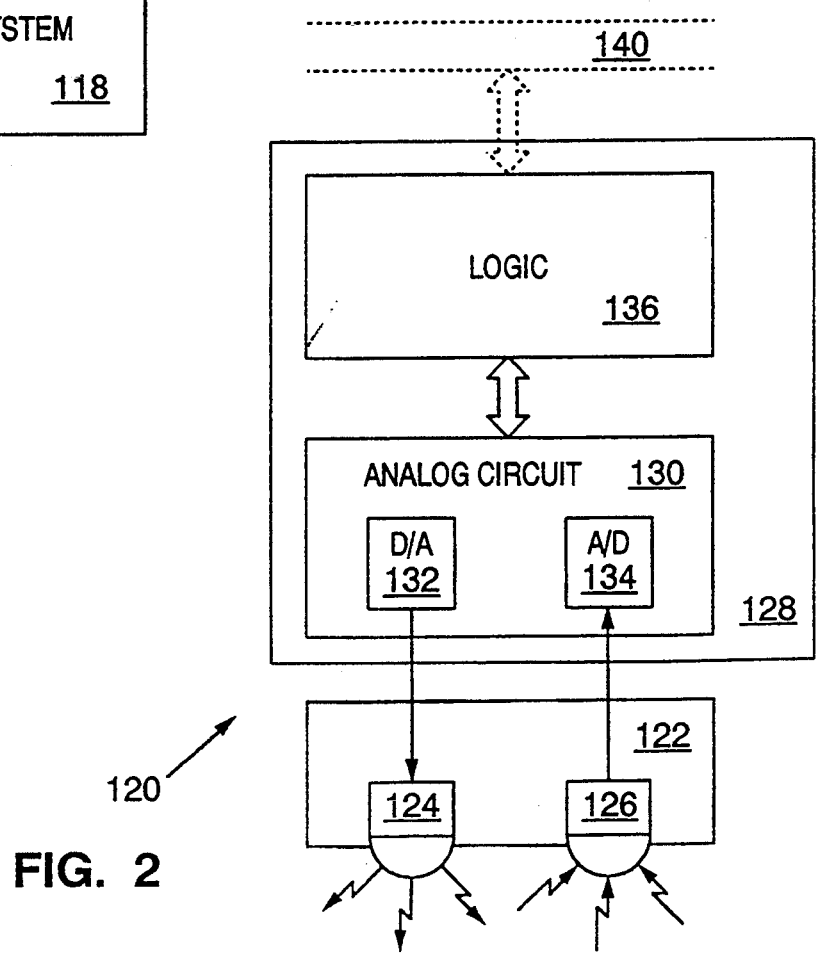
FIG. 2 shows a block diagram of a repeater according to the preferred embodiment.

FIG. 2 shows a block diagram of a repeater according to the preferred embodiment. A repeater may be present but is not an absolute requirement according to the present invention. The repeater 120 includes an infrared transceiver 122. The transceiver 122 includes an infrared transmitter 124 such as an infrared light emitting diode, an infrared receiver 126 such as a photo diode or a phototransistor and the appropriate control circuitry 128. Multiple infrared light emitting diodes may be used to increase the transmission power of the infrared transmitter 124. The control circuitry 128 will include analog circuitry 130 to drive the light emitting diodes including an A/D converter 132 and to evaluate signals received from the photo diode including an A/D converter 134. The control circuitry 128 also includes logic circuits 136 which can communicate with the analog circuitry 130. The logic circuit 136 has sufficient capability to carry out the functions described below. For certain applications the logic circuits will be coupled to logic circuits of other repeaters via a hardware repeater bus 140.

Nodes and repeaters according to the present invention send information in packets with a synchronization (sync) pulse prefix. A node can only send a packet with an A-sync or a C-sync. A repeater can only send a B-sync or a D-sync. A node can receive either but not both an A-sync or a B-sync. A repeater can receive B-sync, C-sync or D-sync. The circumstances controlling when these sync signals and appended information packets can be sent or received are described below.

The preferred sync pulse includes 64 bits. The first 48 bits provide synchronization. The remaining 16 bits define the sync type. The binary data for the pulses are as follows:

```
A-sync                B-sync
0101010101010101      0101010101010101
0101010101010101      0101010101010101
0101010101010010      0101010101010010
0000000000100000      0000000000010000

C-sync                D-sync
0101010101010101      0101010101010101
0101010101010101      0101010101010101
0101010101010010      0101010101010010
0000000000001000      0000000000000100
```

Packets are all a predetermined size, preferably 64 byte of information. Bytes of different sizes can be used.

CASE I: NO REPEATER PRESENT

Figure 3:
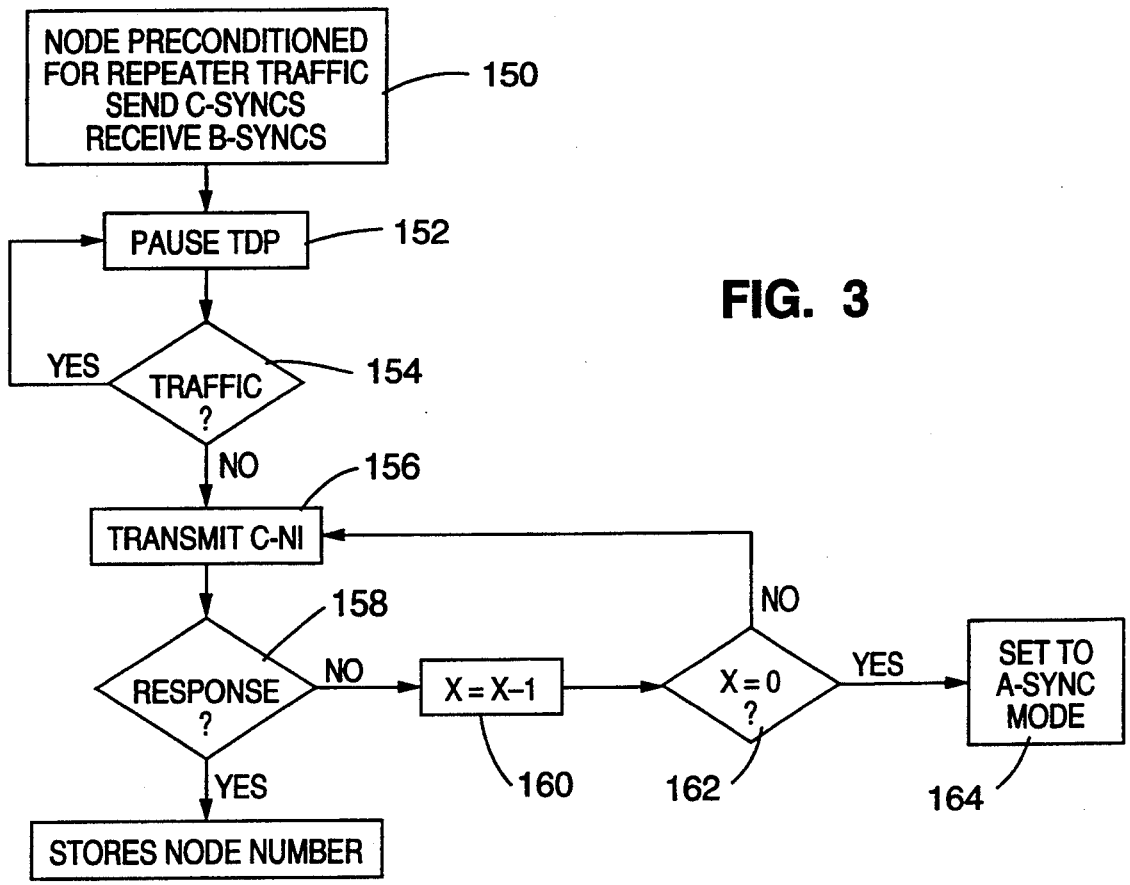
FIG. 3 shows a flow chart of the LOG IN sequence.

Consider a room having no infrared repeater device, for example a small corporate conference room. A first user enters the room to attend a meeting. The user brings their notebook computer which contains information to be electronically shared with other attendees. A node must first establish its connection to a network (LOG IN) before it can send or receive network traffic; FIG. 3 shows a flow chart of this sequence.

A node is preconfigured 150 to expect a system having a repeater and thus, can only send packets with a C-sync prefix (a C-sync packet) and can only receive packets with a B-sync prefix (a B-sync packet). In the alternative, nodes could be configured to expect no repeater and thus, could only send or receive A-sync packets. In the preferred embodiment, the node first pauses for a required traffic delay period TDP 152 to determine whether there is any network traffic within the field of view of the node and thereby avoid collisions. If there is network traffic during the TDP 154, the node pauses the TDP again, if not, it transmits a C-sync network identification packet (C-NI) 156 which interrogates whether there is a repeater that can detect the synchronization pulse. If the node receives no response to the C-NI within the TDP the lone node will recondition 164 itself to receive signals from other nodes. The node may repeat the C-NI 160 and 162 X times first to ensure that it is properly sending the message and that its transceiver is not blocked, such as by the user's hand. The node will now transmit an A-sync network identification message (A-NI) 166 which identifies itself, and lists the nodes it has contacted.

If a second node is brought into the room, it will duplicate the steps just described relative to the first node. If it sees node 1's A-NI announcement, it will ignore that announcement because is it configured to only see B-sync packets. Node 2 will then transmit a C-NI signal interrogating whether there is a repeater within its transmission radius. Because there is no repeater in a Case 1 situation, node 2 will receive no acknowledgement of the presence of a repeater. Accordingly, node 2 will reconfigure itself to receive signals from another node. Now both nodes 1 and 2 are configured to receive signals from other nodes.

Each A-NI packet identifies the source user and lists each user it can communicate with. Until one user receives an A-NI packet each list will be the null set. Once a node receives an A-NI packet it will respond with an A-NI packet identifying its user and the users it can see.

Because this system is applicable to networks where the identification of a user is important for such applications as sending electronic mail or controlling access to the network or particular data to authorized users, it is important that individual users be recognized. Thus the A-IN packet may include the user's LOG IN identification as the node identification. The lists of recognizable users would then include the network LOG IN identification for each user whose node is identified by each other node. Such a list would entail significant overhead for packet transmission. Accordingly, node numbers may be assigned to the individual nodes recognized in the network. For example, the first node to be recognized by another node would be assigned node 1 the next node as node 2 and so on. The A-IN message would then entail the message indicating the transmitting user's LOG IN identification, the node number and then the list of node numbers. In this way, the traffic overhead for the list is greatly reduced. To simplify this disclosure, the references hereafter will recite only "I am node n, I see node 1, node 2 . . . " and it will be understood that user identification has been considered.

This cycle will continue until a third node enters the room. The third node will not recognize any information being transmitted by either node 1 or node 2 because it is preconditioned to only recognize C-sync packets. Rather, the third node will wait the TDP, and follow that with a C-sync looking for a repeater. Because this room has no repeater, the third node will eventually reconfigure itself to accept A-sync packets according to the flow chart of FIG. 3. It will then recognize the transmissions from nodes 1 and 2. At an appropriate time, node 3 will respond with its A-NI packet "I am node 3, I see nodes 1 node 2". This procedure can repeat indefinitely for any number of nodes in a room that has no repeater.

If one of the users takes their node from the room, that node will no longer respond with its network identification message. For example, if node 2 leaves the room after its last roll call message, node 3 will say, "I am node 3, I see node 1, node 2". Node 1 will then respond, "I am node 1, I see node 2, node 3". Because there is no node 2 it will not respond with its appropriate roll call message. After waiting for the TDP, node 3 then responds with the A-sync packet "I am node 3, I see node 1". A new node that is brought into the room later will be assigned the vacant node number 2.

Naturally, the A-NI roll taking overhead is temporarily suspended at such time as there is valid network traffic. The roll taking only occurs during network empty times after the TDP has passed.

Figure 4A:
FIGS. 4A through 4C show the sequence of steps for communication between nodes according to Case I of the present invention.
Figure 4B:
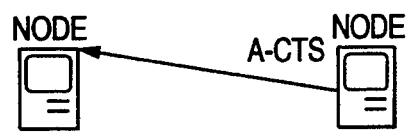
Figure 4C:

Data is communicated between and among the nodes for Case I by the following procedure shown in FIG. 4. For example, if node 1 (50) desires to send data to node 2 (52), node 1 first transmits a request to send signal RTS. Because node 1 (50) is configured to communicate with other nodes, each packet of information includes the A-sync prefix. To indicate this, FIG. 4A shows node 1 transmitting an A-RTS packet, indicating that it is transmitting a request to send with the A-sync prefix. In response node 2 transmits a clear to send packet (CTS). Thus, FIG. 4B shows that node 2 (52) transmits an A-CTS packet. Upon receiving the A-CTS signal, node 1 then transmits its data. The data also includes the A-sync prefix. The RTS and CTS signals also include headers indicating which node is transmitting and the intended receiving node.

Figure 5:
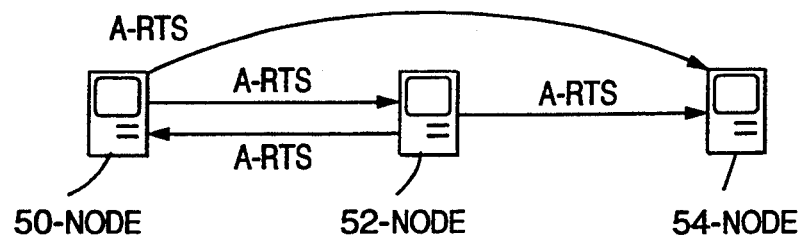
FIG. 5 shows a transmission collision according to Case I.

Consider a system where there a three nodes, 50, 52 and 54 as shown in FIG. 5. The possibility for a data collision exists. For example, node 1 (50) and node 2 (52) may each want to transmit data at the same time. Each sends a request to send signal. Node 1 (50) transmits an A-RTS to node 3 (54) and node 2 (52) transmits an A-RTS to node 1 (50). Because the infrared signal is diffused throughout the room, each node receives the transmission of every other node. Because there is a collision in the A-RTS packets, no request to send is properly received by any node in the network. Therefore, no node will respond with an A-CTS packet. After waiting for the appropriate time delay, node 1 (50) and node 2 (52) each realize that their respective A-RTS packet was not received. Each will pause for a random amount of time before resending their requests to send signal. Because the delay is random and changing, eventually one of the A-RTS packets will be appropriately received. If node 1's A-RTS packet is properly received by node 3 it will also be properly received by node 2. Node 2 will recognize that the A-RTS is not intended for it, however, it will refrain from transmitting its A-RTS until the data transmission between node 1 and node 3 is complete. Node 3 automatically responds with its A-CTS packet. Node 1 (50) then sends the data to node 3. Node 2 also receives the data but ignores it because it is not the intended recipient.

CASE II: A SINGLE REPEATER SYSTEM

A potential network room contains a single repeater circuit 60 mounted on the ceiling. The repeater could be mounted on a wall, tabletop or any other convenient location.

Figure 6A:
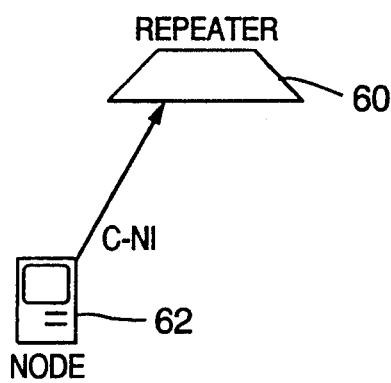
FIGS. 6A and 6D show the steps for a network identification sequence in a single repeater system.
Figure 6B:
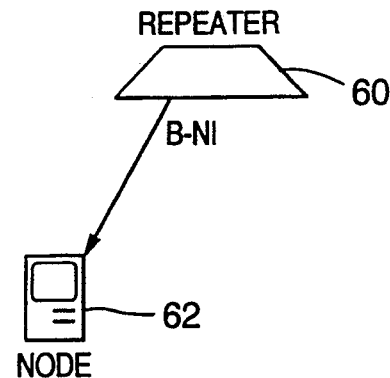
Figure 6C:
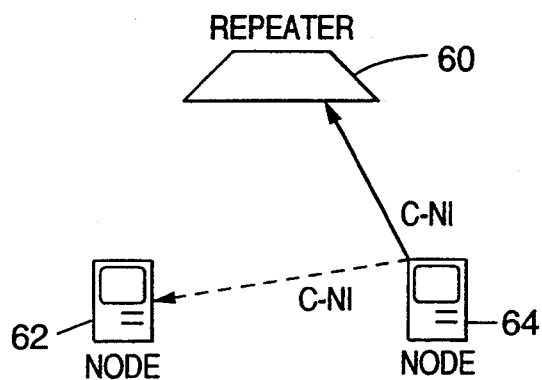
Figure 6D:
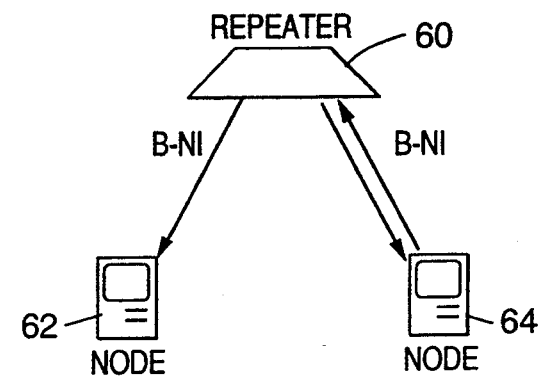

A first node 62 is brought in the room. As with Case I, the node must first LOG IN to the network as shown in FIG. 6A. Returning to the flow chart of FIG. 3, this time the node receives 158 an appropriate response to its transmission of the C-NI packet 156. The repeater transmits an B-NI packet informing the node that it is repeater 1, assigning the node a number, listing the repeaters it sees and the nodes it sees in FIG. 6B. In this case, the node 62 is assigned the node number 1. The repeater 60 will announce which nodes it can communicate with. Similarly, each node will respond with a C-NI packet indicating which repeaters it can communicate with. Because the node C-NI packet has a C-sync prefix, no other node can recognize its C-NI roll taking signal. A second node 64 is brought into the room in FIG. 6C and transmits a C-NI packet. Node 1 (62) also receives the C-NI packet, but, because it is preceded by a C-sync prefix and node I (62) is configured to only receive data or commands from a repeater, i.e., packets having a B-sync prefix, it ignores the message. The repeater 60 transmits the B-NI packet with a B-sync prefix indicating that it is a repeater and it can communicate with node 1 (62) and node 2 (64) as shown in FIG. 6D.

Figure 7A:
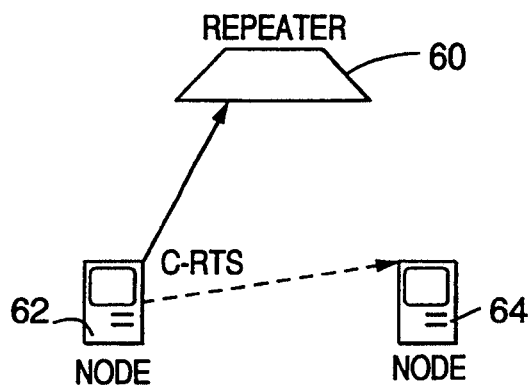
FIGS. 7A through 7F show the sequence of steps for communication between nodes according to Case II.
Figure 7B:
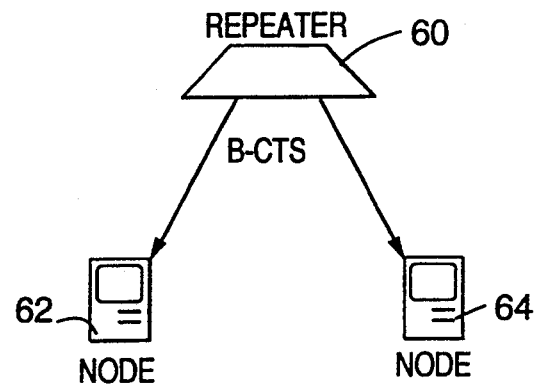
Figure 7C:
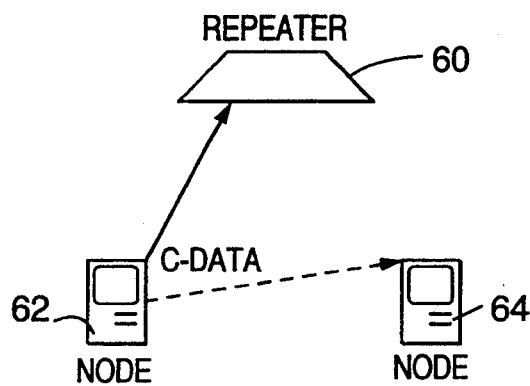
Figure 7D:
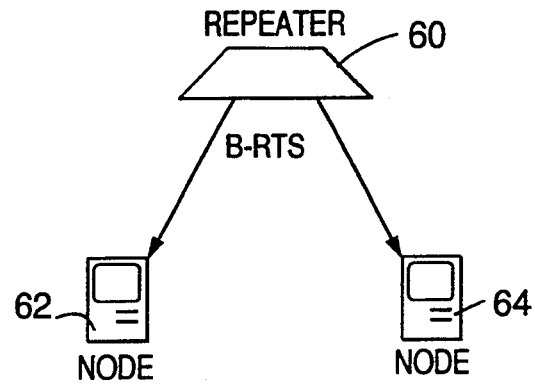

FIGS. 7A–7F show a data communications sequence from node 1 (62) to node 2 (64) of the network of FIG. 5. Node 1 (62) first transmits a C-RTS. The repeater 60 receives the C-RTS. Node 2 ignores the signal because of the C-sync prefix. In FIG. 7B the repeater transmits a B-CTS. All nodes within the field of view of the repeater receive the signal. Node 2 of course, cannot act on the signal because it did not send an RTS packet. Node 1 begins to transmit its data with a C-sync prefix. Because the data has a C-sync prefix, node 2, the intended recipient, ignores the data as shown by a dotted line in FIG. 7C.

Figure 7E:
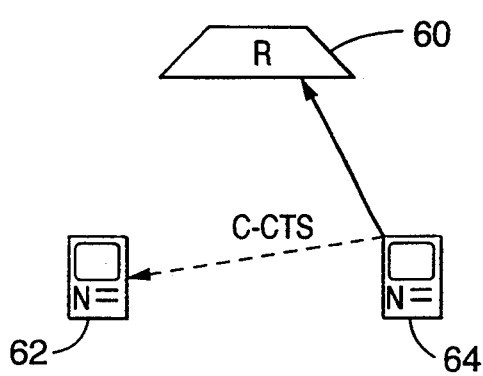
Figure 7F:
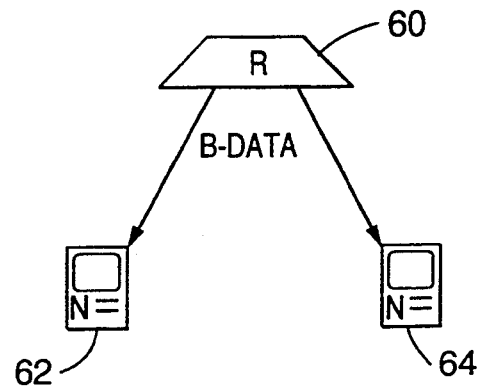

The data being transmitted from node 1 is now stored in memory in the repeater 60. The repeater transmits a B-RTS packet indicating it needs to transmit data to node 2. Node 1 and node 2 each receive the B-RTS. Because node 2 (64) is the intended recipient, node 2 responds with a C-CTS. Node 1 also receives the C-CTS but ignores it because of the C-sync prefix as shown in FIG. 7E. In FIG. 7F, the repeater 60 transmits the data with a B-sync prefix. Because it did not send a C-CTS packet, node 1 will ignore the data. Node 2 (64) receives the data.

Case III: A SYSTEM WITH MULTIPLE REPEATERS

The present invention is also operable in a system having multiple repeaters. In such a system it is possible, and in fact likely, that any one repeater may not be able to communicate directly with all nodes or all repeaters in the network. Similarly, some nodes may be able to communicate with more than one but not all of the repeaters in the network. Nevertheless, as a user moves with their node throughout a room having multiple repeaters or throughout a network having multiple rooms and multiple repeaters, the user needs to maintain their link to the network.

Even though there are multiple repeaters, a node must still LOG IN to the network just as in Case I and Case II. As in Case II, a node can only transmit a C-sync packet and only receive a B-sync packet. A repeater can receive C-sync packages from a node, B-sync packets from other repeaters and D-sync packets from other repeaters. A repeater can only transmit data when it has proper authority which be indicated by a token.

Consider the network shown in FIG. 8. There are three repeaters 70, 72 and 74 and seven nodes 76, 78, 80, 82, 84, 86 and 88. The repeater 70 can communicate directly with nodes 76, 78 and 80. The repeater 72 can communicate with repeater 80, 82 and 84. The repeater 74 can communicate with node 84, 86 and 88. Each of the nodes could receive and transmit infrared signals to its adjacent neighbors if they were so configured.

As in Case I and Case II, there will be a roll taking network identification packet sent by a node or a repeater whenever there is dead time on the network. As with Case II, whenever a repeater transmits a network identification packet it will include a B-sync prefix indicating that it is a node. Similarly, any network identification packet transmitted by a node will include a C-sync packet indicating that it is a node.

Each repeater will transmit a B-NI packet to it's nodes indicating which nodes it can see as before. Each repeater will also periodically transmit a D-NI packet to the other repeaters in the network indicating to them which nodes they can see. A repeater cannot transmit B-sync packets without possession of a token.

Figure 8A:
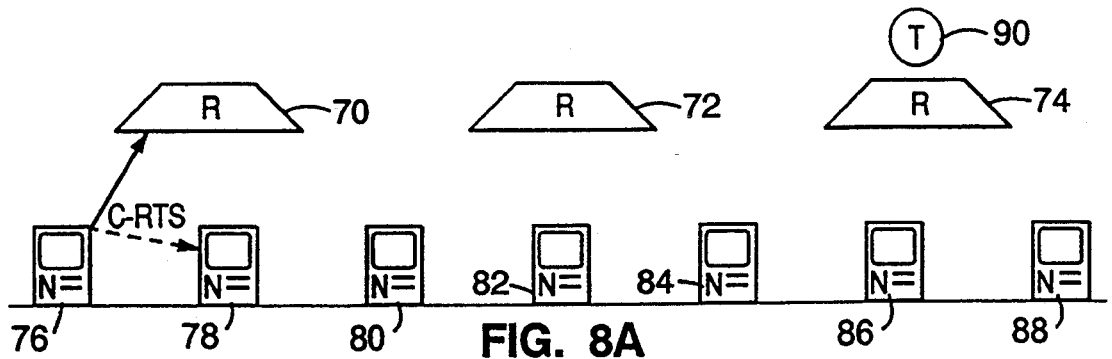
FIGS. 8A through 8R show the sequence of steps for communication between nodes according to Case III.
Figure 8B:
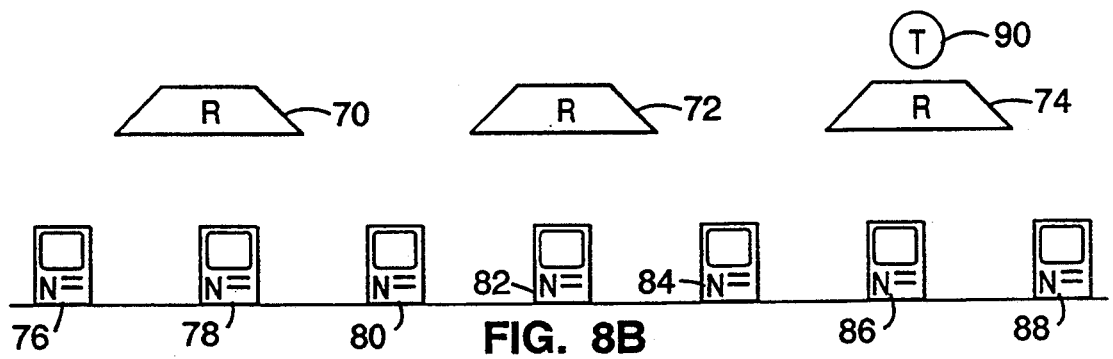
Figure 8C:
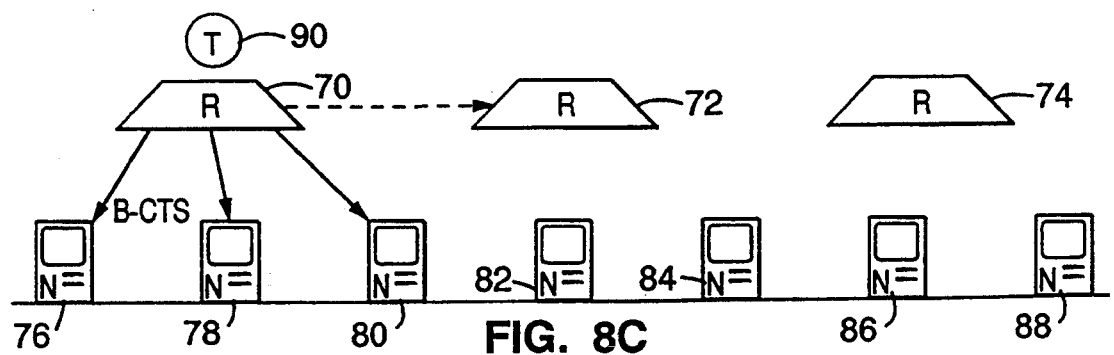
Figure 8D:
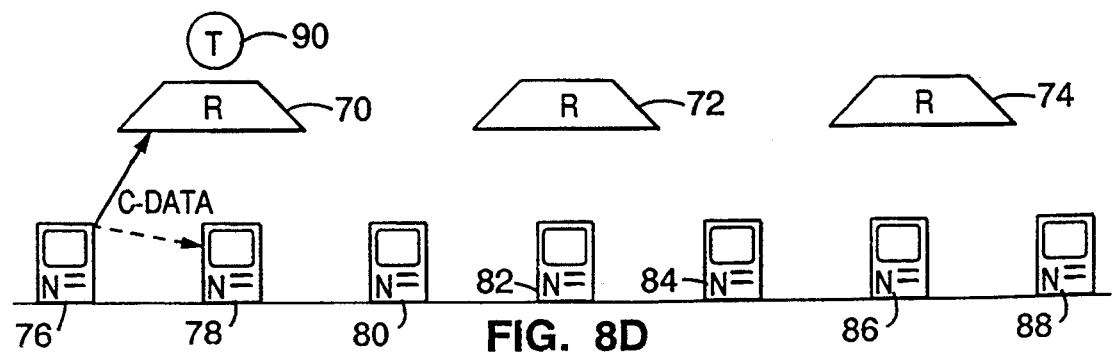
Figure 8E:
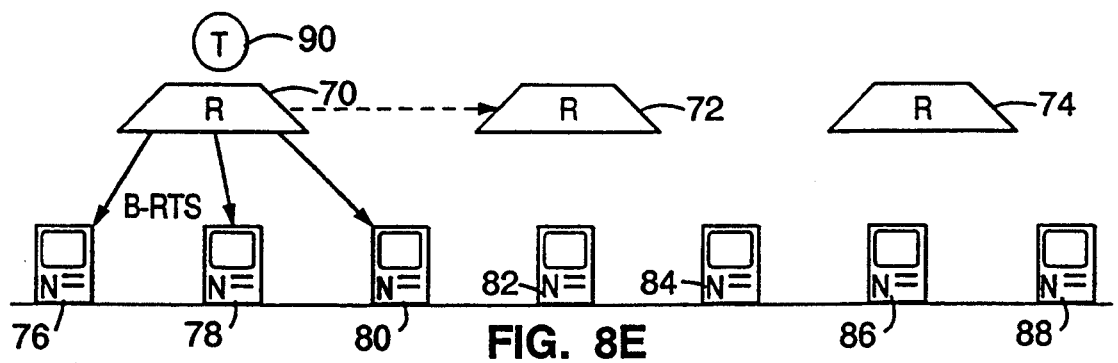
Figure 8F:
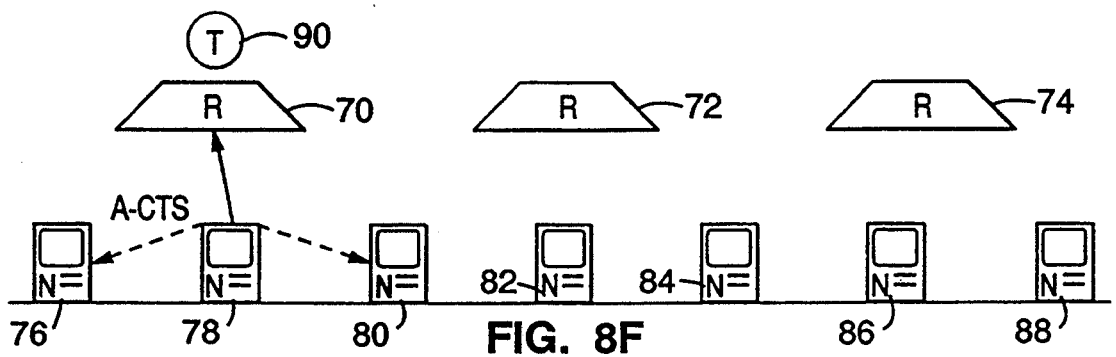
Figure 8G:
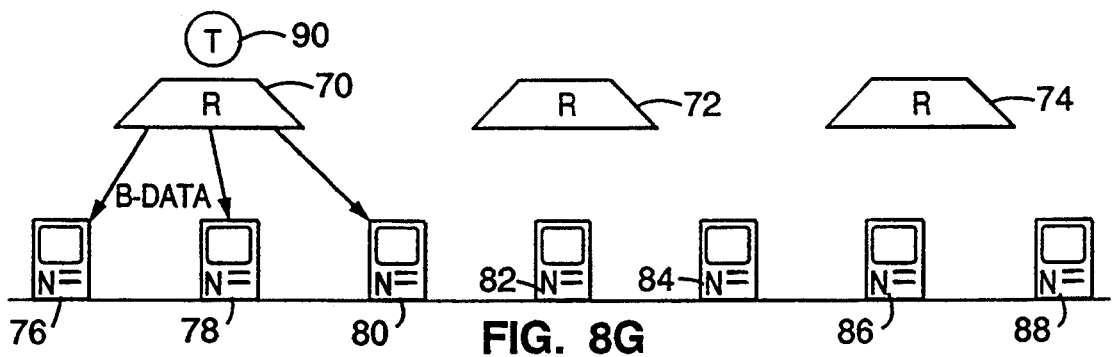

In FIG. 8A the node 76 wants to transmit information to the node 78. The node 76 transmits a C-RTS to the repeater 70 as in Case II. As shown in FIG. 8A the repeater 70 does not respond to the A-RTS from the node 76 because it does not possess the token 90. If the repeater 70 receives the token 90 within a proper delay time it will respond with a B-CTS signal as shown in FIG. 8C. If it receives the token too late for such response, eventually the node 76 will repeat the C-RTS packet and repeat the sequence shown in FIG. 8A. Once the repeater 70 transmits an appropriate B-CTS signal, it is received by the nodes 76, 78 and 80 as well as the repeater 72. Because the repeater 72 ignores any B-sync packets that transmission is shown with a dotted line in FIG. 8C. The nodes 78 and 80 will ignore the transmission because they did not send a C-RTS signal. The node 76 transmits a C-sync packet with the data to be transferred. Because the data has a C-sync prefix, the node 78 ignores the transmission as shown in FIG. 8D. The data is stored in the repeater 70 which then transmits a B-RTS signal indicating it wishes to transmit data to the node 78. Nodes 76 and 80 as well as the repeater 72 each receive the infrared transmission. The repeater 72 ignores it because it has a B-sync prefix. The nodes 76 and 80 ignore the message because they are not the addressed recipient. The node 78 transmits a C-CTS signal to the repeater 70. The nodes 76 and 78 cannot recognize the C-CTS command because it has a C-sync prefix. Because the node 70 still has possession of the token 90 it transmits the data to the node 78. Because the nodes 76 and 80 did not transmit a CTS signal they will ignore the data.

Figure 8H:
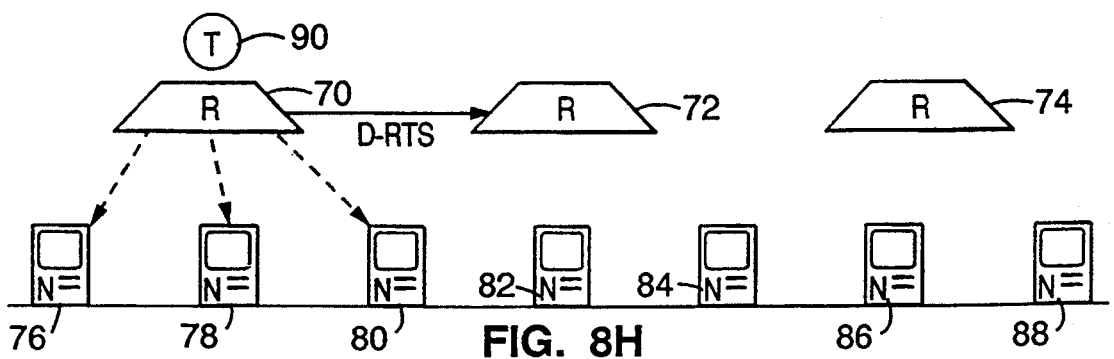
Figure 8I:
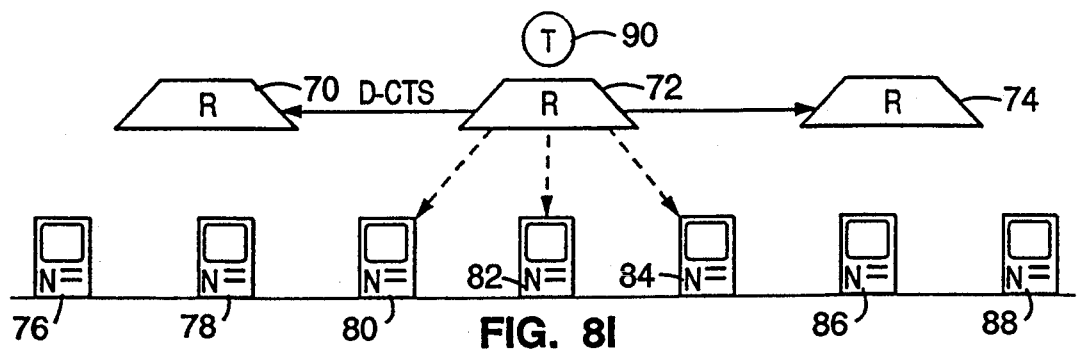

FIG. 8H shows the repeater 70 transmitting a D-RTS to the repeater 72. The nodes 76, 78 and 80 ignore this transmission because it has a D-sync prefix. D-sync packet communication between repeaters are used to transfer the token. In this case, the repeater 70 tells the repeater 72 that it has a token and would like to pass it along. In FIG. 8I the repeater 72 transmits a D-CTS to the repeater 70. The repeater 74 ignores this signal because it did not transmit a RTS. The nodes 80, 82 and 84 ignore this transmission because it has a D-sync prefix. The token is thereby transferred from the repeater 70 to the repeater 72. A similar sequence of steps is followed to transmit the token from the repeater 72 to the repeater 74 in FIG. 8J.

Figure 8J:
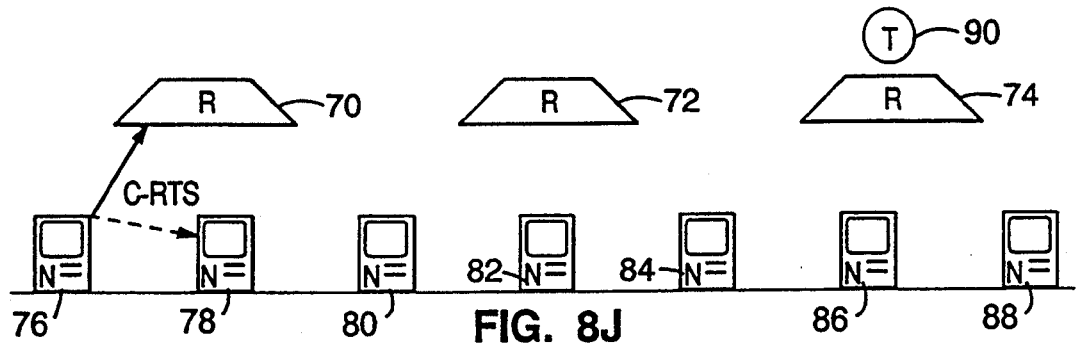
Figure 8K:
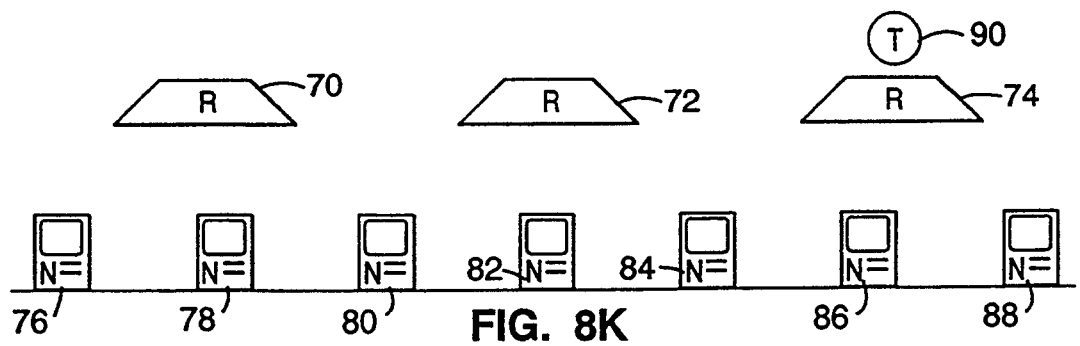
Figure 8L:
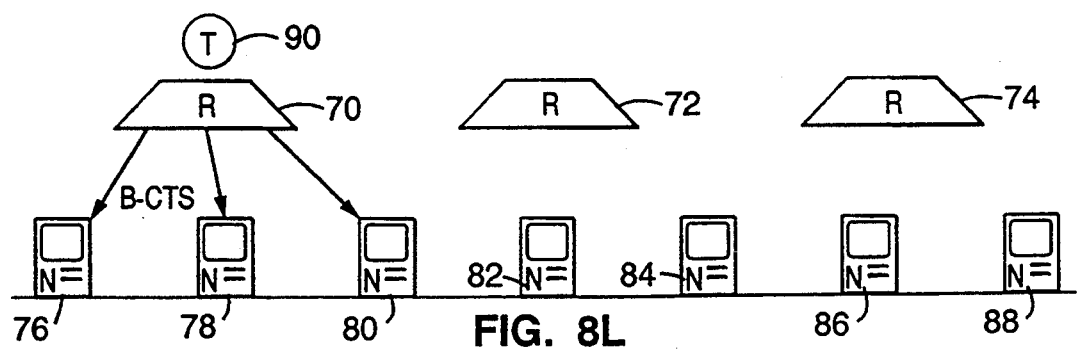
Figure 8M:
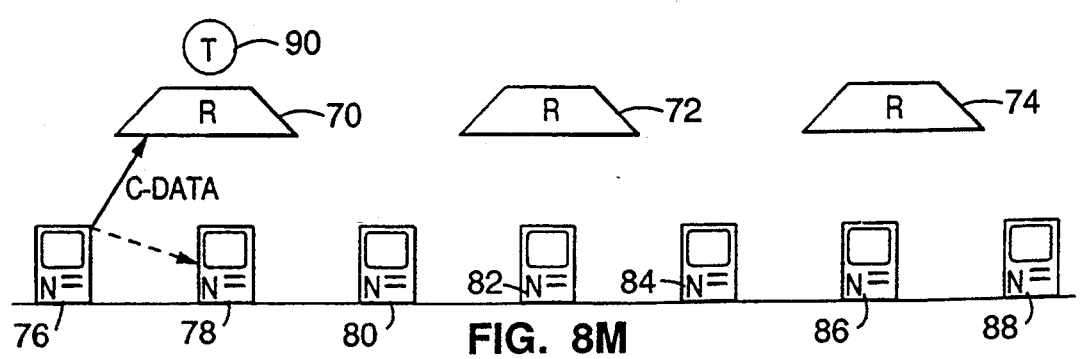
Figure 8N:
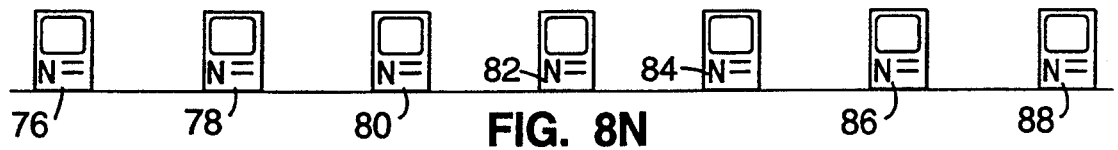
Figure 8P:
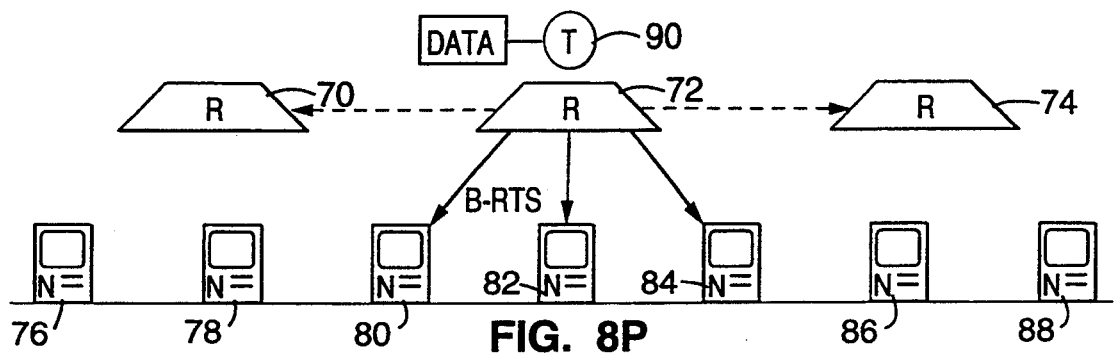
Figure 8Q:
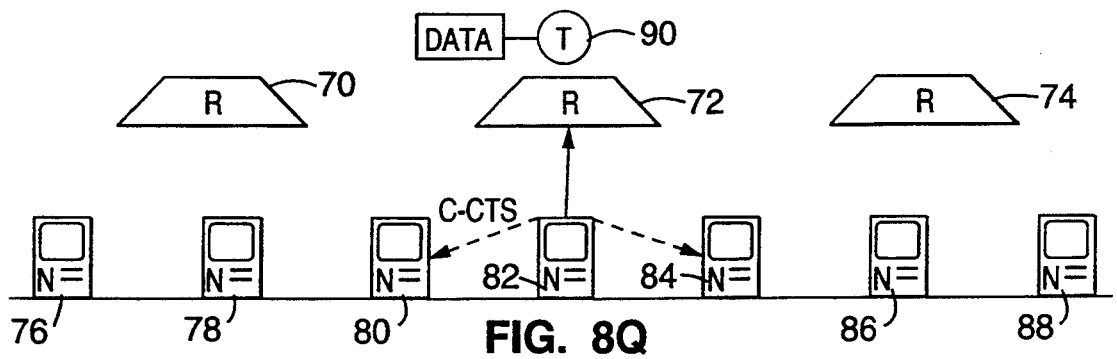
Figure 8R:
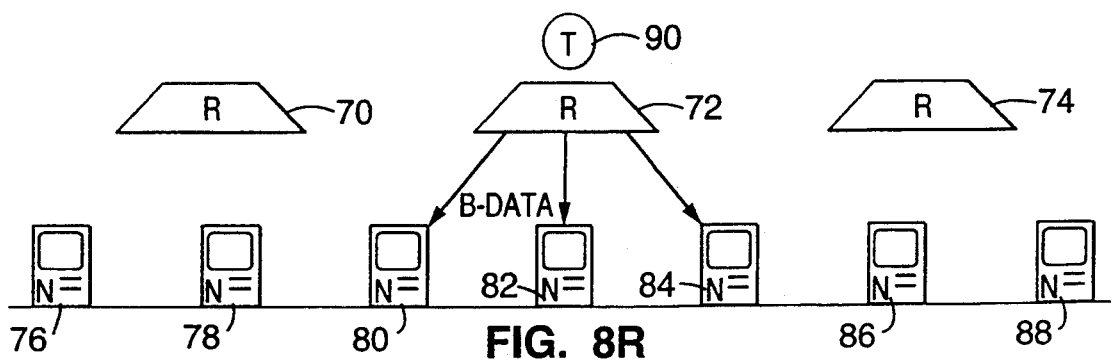

In FIG. 8J the node 76 transmits a C-RTS requesting to send data to the node 82. Repeater 70 is the only repeater which receives the C-RTS transmission from the node 76 but because it does not own the token 90 the repeater 70 does not respond as shown in FIG. 8K. The token is transferred from the repeater 74 to the repeater 70 in FIG. 8L. Accordingly, the repeater 70 transmits a B-CTS signal. The nodes 78 and 80 ignore the B-CTS because they did not transmit a C-RTS. The node 76 transmits the data with a C-sync prefix and only the repeater 70 accepts the data in FIG. 8M. In FIG. 8N the token 90 is graphically indicated to hold the data. However, it will be understood that the data is actually stored in a memory circuit within the repeater 70. The token is transferred from the repeater 70 to the repeater 72 in FIG. 8O. The data is also transferred along with the token via the D-RTS, D-CTS and D-data sequence. Once the repeater 74 has the data stored in its memory circuit, the repeater transmits a D-RTS signal which is ignored by the repeaters 70 and 74 in FIG. 8O. Because the node 82 is the intended recipient, it responds with a C-CTS signal which only the repeater 74 acknowledges. The repeater 74 then transmits the data with a B-sync prefix in FIG. 8Q.

Figure 9A:
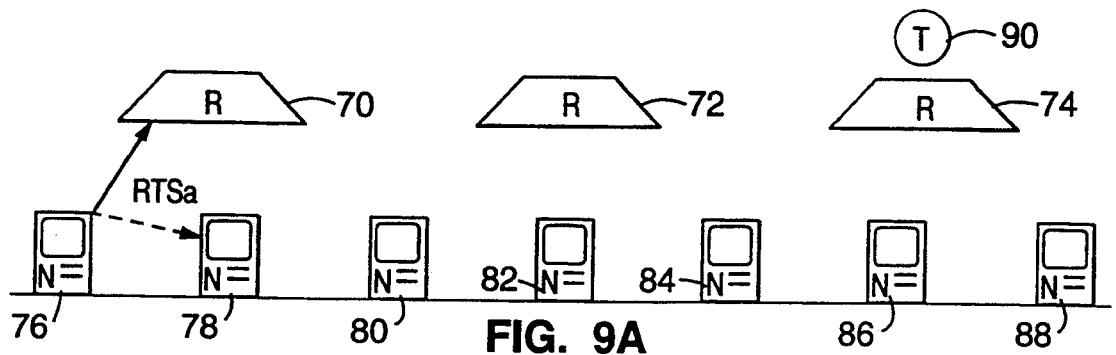
FIGS. 9A through 9C show the sequence of steps for communication between nodes according an alternate embodiment of Case III.
Figure 9B:
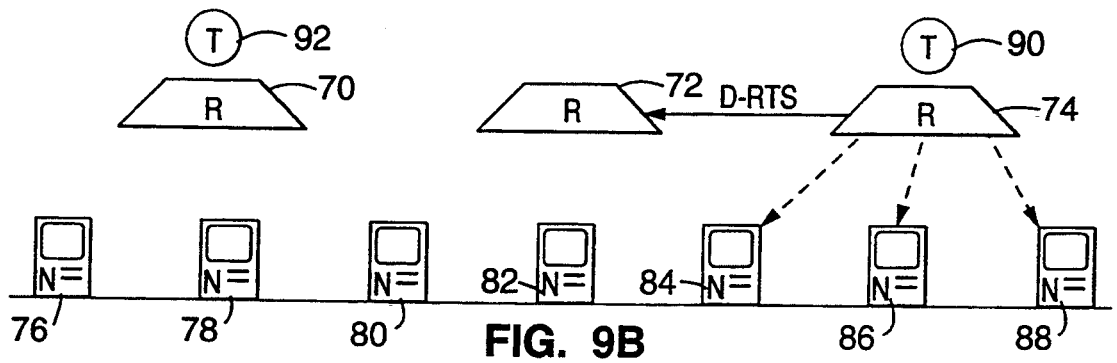
Figure 9C:
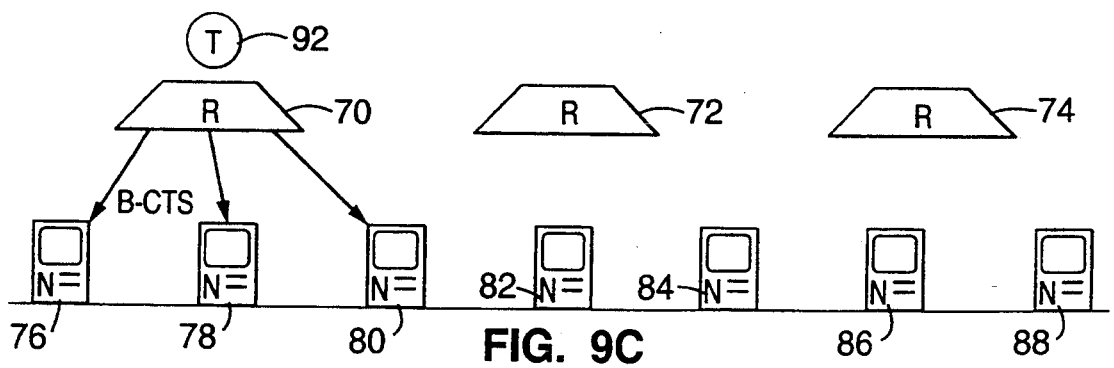

The token is passed from repeater to repeater using D-sync packets. Therefore, each repeater will know whether an adjacent repeater owns the token. Because of this, in an alternate embodiment it is possible for a repeater to manufacture a token in the event that an adjacent repeater does not own a token. For example, in FIG. 9A if the node 76 wanted to transmit data to the node 78 while the repeater 74 owned the token, the repeater 70 could manufacture a second token 92 as shown in FIG. 9B. In FIG. 9B the repeater 74 attempts to pass along the token 90. However, the repeater 72 cannot accept the token 90 because two repeaters cannot own a token which can each communicate with a common node. In this case, the two repeaters 70 and 72 can each communicate with the node 80. The repeater 74 will attempt to give away the token 90 for a particular period of time. If no repeater will accept the token the repeater 74 will then destroy the token 90. It may be possible that all tokens because destroyed. This is not a problem because a token can be created by any repeater upon an appropriate C-RTS packet from a node requesting to send information.

What is claimed is:

1. A diffuse infrared communication method used in a room of indeterminate size, for communication between a plurality of nodes, the method comprising the steps of:
    a. each node determining if there is at least one repeater present in the room;
    b. if there is not at least one repeater present in the room, then each node configuring itself to send and receive communications directly with other nodes present in the room; and
    c. if there is at least one repeater present in the room, then each node configuring itself to send and receive communications with other nodes only through one or more repeaters.

2. The method as claimed in claim 1 wherein each repeater can communicate with other repeaters or nodes only when it is in possession of a token.

3. The method as claimed in claim 2 wherein each repeater can manufacture a token that will allow it to communicate with other repeaters or nodes, when an adjacent repeater is not in possession of a token.

4. A diffuse infrared communication system for use in a room of indeterminate size for communicating between a plurality of nodes, each node capable of configuring itself to communicate with other nodes through a repeater when at lease one repeater is present in the room or configuring itself to communicate directly with other nodes when no repeater is present in the room, and each repeater capable of communicating with both nodes and repeaters.

5. The diffuse infrared communication system as claimed in claim 4 wherein each repeated can communicate with other repeaters or nodes only when it is in possession of a token and where each repeater has the ability to manufacture a token to communicate with a node provided that the node cannot also communicate with a second repeater which already holds a token.

* * * * *